(12) United States Patent
Harley

(10) Patent No.: US 10,108,286 B2
(45) Date of Patent: Oct. 23, 2018

(54) AUTO-BASELINE DETERMINATION FOR FORCE SENSING

(71) Applicant: Apple Inc., Cupertino, CA (US)

(72) Inventor: Jonah A. Harley, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/789,407

(22) Filed: Jul. 1, 2015

(65) Prior Publication Data

US 2016/0179264 A1 Jun. 23, 2016

Related U.S. Application Data

(63) Continuation of application No. 14/425,003, filed as application No. PCT/US2013/031818 on Mar. 15, 2013.

(60) Provisional application No. 61/695,287, filed on Aug. 30, 2012.

(51) Int. Cl.
G06F 3/041 (2006.01)
G06F 3/043 (2006.01)
G06F 3/044 (2006.01)

(52) U.S. Cl.
CPC ........... *G06F 3/0414* (2013.01); *G06F 3/043* (2013.01); *G06F 3/044* (2013.01); *G06F 3/0416* (2013.01); *G06F 3/0418* (2013.01); *G06F 2203/04105* (2013.01)

(58) Field of Classification Search
CPC ... G06F 3/0414–3/0418; G06F 3/043–3/0436; G06F 2203/04105; G06F 3/044
See application file for complete search history.

(56) References Cited

U.S. PATENT DOCUMENTS

| 4,526,043 A | 7/1985 | Boie et al. |
| 4,964,302 A | 10/1990 | Grahn et al. |
| 5,209,126 A | 5/1993 | Grahn |
| 5,673,041 A | 9/1997 | Chatigny et al. |

(Continued)

FOREIGN PATENT DOCUMENTS

| CN | 1740958 | 3/2006 |
| CN | 101458606 | 6/2009 |

(Continued)

OTHER PUBLICATIONS

Bau, et al., "TeslaTouch: Electrovibration for Touch Surfaces," UIST'10, Oct. 3-6, 2010, New York, New York USA, 10 pages.

(Continued)

*Primary Examiner* — Liliana Cerullo
(74) *Attorney, Agent, or Firm* — Brownstein Hyatt Farber Schreck, LLP

(57) ABSTRACT

Determining an applied force of touch on a touch device, in response to a time-varying signal generated by a force of touch sensor. Inferring a measure of force of touch in response to that signal, by determining a peak value of a time derivative of that signal, determining a fraction of that peak value, determining a force of touch corresponding to that peak value, and setting that force as a baseline value for a particular user. Responding to force of touch by the user by comparing against that baseline value. Distinguishing between users having differing baseline values.

29 Claims, 12 Drawing Sheets

(56) References Cited

U.S. PATENT DOCUMENTS

| | | | |
|---|---|---|---|
| 5,854,450 A * | 12/1998 | Kent | G06F 3/0418 |
| | | | 178/18.01 |
| 6,400,285 B1 | 6/2002 | Gifford | |
| 6,888,536 B2 | 5/2005 | Westerman et al. | |
| 7,331,245 B2 | 2/2008 | Nishimura et al. | |
| 7,538,760 B2 | 5/2009 | Hotelling et al. | |
| 7,629,966 B2 | 12/2009 | Anson | |
| 8,169,332 B2 | 5/2012 | Son | |
| 8,201,739 B2 | 6/2012 | Schneider et al. | |
| 8,289,290 B2 | 10/2012 | Klinghult | |
| 8,421,483 B2 | 4/2013 | Klinghult et al. | |
| 8,423,089 B2 | 4/2013 | Song et al. | |
| 8,471,824 B2 | 6/2013 | Kim et al. | |
| 8,570,162 B2 | 10/2013 | Ujii et al. | |
| 8,570,297 B2 | 10/2013 | Bulea et al. | |
| 8,633,916 B2 | 1/2014 | Bernstein et al. | |
| 8,674,947 B2 | 3/2014 | Henderson et al. | |
| 8,711,122 B2 | 4/2014 | Wada et al. | |
| 8,711,128 B2 | 4/2014 | Small et al. | |
| 8,730,199 B2 | 5/2014 | Sleeman et al. | |
| 8,791,899 B1 | 7/2014 | Usey | |
| 8,803,848 B2 | 8/2014 | Suarez Rovere | |
| 9,024,886 B2 | 5/2015 | Doi et al. | |
| 9,063,593 B2 | 6/2015 | Schneider et al. | |
| 9,127,999 B2 | 9/2015 | Tsuruno | |
| 9,170,668 B2 | 10/2015 | Schneider et al. | |
| 9,594,450 B2 | 3/2017 | Lynn et al. | |
| 9,772,721 B2 | 9/2017 | Huppi et al. | |
| 2001/0023204 A1 | 9/2001 | Komata | |
| 2006/0244733 A1 * | 11/2006 | Geaghan | G06F 3/041 |
| | | | 345/173 |
| 2008/0185281 A1 | 8/2008 | Chang et al. | |
| 2008/0198145 A1 | 8/2008 | Knowles et al. | |
| 2009/0019949 A1 | 1/2009 | Rothkopf et al. | |
| 2009/0160808 A1 | 6/2009 | Wu et al. | |
| 2009/0228791 A1 | 9/2009 | Kim et al. | |
| 2010/0066697 A1 | 3/2010 | Jacomet et al. | |
| 2010/0079382 A1 | 4/2010 | Suggs | |
| 2010/0123686 A1 | 5/2010 | Klinghult et al. | |
| 2010/0225604 A1 * | 9/2010 | Homma | G06F 3/0414 |
| | | | 345/173 |
| 2010/0253645 A1 * | 10/2010 | Bolender | G06F 3/0414 |
| | | | 345/174 |
| 2011/0012760 A1 | 1/2011 | Klinghult | |
| 2011/0095919 A1 | 4/2011 | Ostermoeller et al. | |
| 2011/0163991 A1 | 7/2011 | Tout | |
| 2011/0199342 A1 | 8/2011 | Vartanian et al. | |
| 2011/0254762 A1 | 10/2011 | Dahl et al. | |
| 2012/0086666 A1 | 4/2012 | Badaye et al. | |
| 2012/0105358 A1 * | 5/2012 | Momeyer | G06F 3/0414 |
| | | | 345/174 |

FOREIGN PATENT DOCUMENTS

| | | |
|---|---|---|
| EP | 1840715 | 10/2007 |
| EP | 2141566 | 1/2010 |
| WO | WO 11/024457 | 3/2011 |

OTHER PUBLICATIONS

Feist, "Samsung snags patent for new pressure sensitive touchscreens," posted on AndroidAuthority.com at URL: http://www.androidauthority.com/samsung-patent-pressure-sensitive-touchscreens-354860, Mar. 7, 2014, 1 page.

Bantz, "Keyboard Device for Upper and Lower Case Keying Without Shifting," IBM Technical Disclosure Bulletin, International Business Machines Corp. (Thornwood, vol. 21, No. 9, 1979, pp. 3845-3846.

* cited by examiner

AUTO-BASELINE DETERMINATION FOR FORCE SENSING

CROSS REFERENCE TO RELATED APPLICATIONS

This application is a continuation of U.S. patent application Ser. No. 14/425,003, filed Feb. 27, 2015, and entitled "Auto-Baseline Determination for Force Sensing," which is a 35 U.S.C. § 371 application of PCT/US2013/031818, filed Mar. 15, 2013, and entitled "Auto-Baseline Determination for Force Sensing," and further claims the benefit under 35 U.S.C. § 119(e) to U.S. provisional application No. 61/695,287, filed Aug. 30, 2012, and entitled, "Auto-Baseline Determination for Force Sensing," all of which are incorporated by reference as if fully disclosed herein.

BACKGROUND

Field of the Disclosure

This application generally relates to determination of force of touch by ultrasonic, capacitive or optical methods.

Background of the Disclosure

Touch devices generally provide for identification of positions where the user touches the device, including movement, gestures, and other effects of position detection. For a first example, touch devices can provide information to a computing system regarding user interaction with a graphical user interface (GUI), such as pointing to elements, reorienting or repositioning those elements, editing or typing, and other GUI features. For a second example, touch devices can provide information to a computing system suitable for a user to interact with an application program, such as relating to input or manipulation of animation, photographs, pictures, slide presentations, sound, text, other audiovisual elements, and otherwise.

It sometimes occurs that, when interfacing with a GUI, or with an application program, it would be advantageous for the user to be able to indicate an amount of force applied when manipulating, moving, pointing to, touching, or otherwise interacting with, a touch device. For example, it might be advantageous for the user to be able to manipulate a screen element or other object in a first way with a relatively lighter touch, or in a second way with a relatively more forceful or sharper touch. In one such case, a it might be advantageous if the user could move a screen element or other object with a relatively lighter touch, while the user could alternatively invoke or select that same screen element or other object with a relatively more forceful or sharper touch.

It sometimes occurs that, when interfacing with a GUI, or with an application program, it would be advantageous for the GUI or application program to be able to determine an identity of the user, or an affect thereof, in response to a degree of force applied by the user when using the touch device. For example, it might occur that a first user and a second user differ in detectable ways with respect to how much force they apply, or when they apply that force, when using that GUI or application program.

Each of these examples, as well as other possible considerations, can cause one or more difficulties for the touch device, at least in that inability to determine an amount of force applied by the user when contacting the touch device might cause a GUI or an application program to be unable to provide functions that would be advantageous. When such functions are called for, inability to provide those functions may subject the touch device to lesser capabilities, to the possible detriment of the effectiveness and value of the touch device. On the other hand, having the ability to provide those functions might provide the touch device with greater capabilities, to the possible advantage of the effectiveness and value of the touch device.

BRIEF SUMMARY OF THE DISCLOSURE

This application provides techniques, including circuits and designs, which can determine an amount of force applied, and changes in amounts of force applied, by the user when contacting a touch pad or touch display, and which can be incorporated into devices using touch recognition, touch elements of a GUI, and touch input or manipulation in an application program. This application also provides techniques, including devices which apply those techniques, which can determine an amount of force applied, and changes in amounts of force applied, by the user when contacting a touch pad, and in response thereto, provide additional functions available to a user of a touch pad.

One embodiment may take the form of an apparatus, comprising: a touch device including one or more force of touch sensors, the force of touch sensors being capable of providing a time-varying signal with respect to a force of touch on the touch device; one or more processors having access to the time-varying signal, the one or more processors configured to: determine a baseline value associated with a particular user, based on the time-varying signal; cause the baseline value for the particular user to be stored in the apparatus; compare one or more values indicative of a force of touch against the baseline value for that particular user; and distinguish between a first type of touch having less force of touch than the baseline value for that particular user, and a second type of touch having more force than the baseline value for that particular user.

Another embodiment may take the form of an apparatus, including: a touch device including one or more force of touch sensors, the force of touch sensors being capable of providing a signal responsive to a force of touch; one or more processors having access to the signal, the one or more processors having access to instructions, the instructions directing the processors to determine a baseline value in response to the signal, wherein the baseline value is substantially stable for a particular user; wherein the touch device is responsive to whether the force of touch exceeds the baseline value for the particular user.

Still another embodiment may take the form of a method, including operations of: providing, from one or more force of touch sensors, a time-varying signal with respect to a force of touch on a touch device associated with the force of touch sensors; by one or more processors coupled to the touch device; determining a baseline value based on a rate of change of said signal, the baseline value being associated with a particular user; comparing a signal with respect to a force of touch with the baseline value for that particular user; and by the touch device, distinguishing between a first type of touch having less force of touch than the baseline value for that particular user, and a second type of touch having more force than the baseline value for that particular user.

Yet another embodiment may take the form of a method, including operations of: providing, from one or more force of touch sensors, a time-varying signal with respect to a force of touch on a touch device associated with the force of touch sensors; by one or more processors coupled to the touch device, determining a baseline value based on a rate of change of said signal, the baseline value being associated with a particular user; comparing a signal with respect to a force of touch with the baseline value for that particular user; and by the touch device, distinguishing between a first type of touch having less force of touch than the baseline value for that particular user, and a second type of touch having more force than the baseline value for that particular user.

While multiple embodiments are disclosed, including variations thereof, still other embodiments of the present disclosure will become apparent to those skilled in the art from the following detailed description, which shows and describes illustrative embodiments of the disclosure. As will be realized, the disclosure is capable of modifications in various obvious aspects, all without departing from the spirit and scope of the present disclosure. Accordingly, the drawings and detailed description are to be regarded as illustrative in nature and not restrictive.

BRIEF DESCRIPTION OF THE FIGURES

While the specification concludes with claims particularly pointing out and distinctly claiming the subject matter that is regarded as forming the present disclosure, it is believed that the disclosure will be better understood from the following description taken in conjunction with the accompanying Figures, in which:

DETAILED DESCRIPTION

Terminology

Figure 1A:
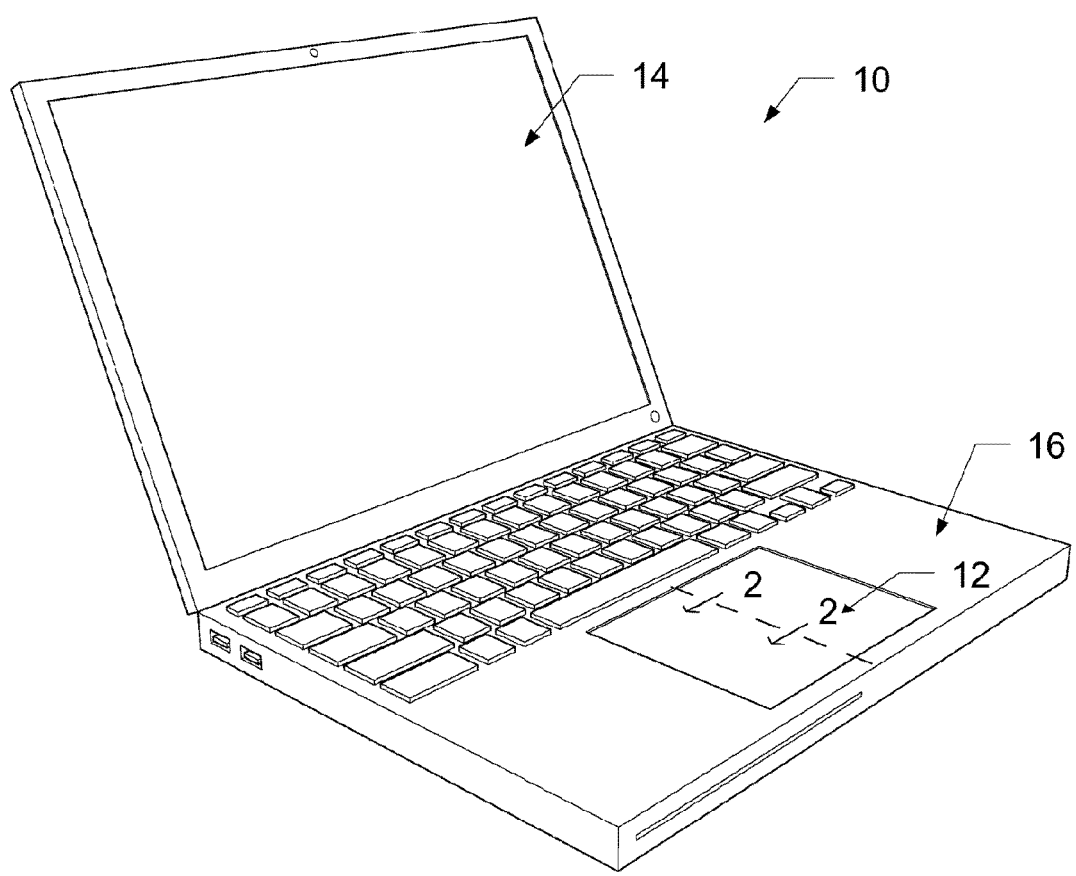
FIG. 1A is a front perspective view of a first example of a computing device incorporating a force sensing device.

The following terminology is exemplary, and not intended to be limiting in any way.

The text "touch sensing element", and variants thereof, generally refers to one or more data sensing elements of any kind, including information sensed with respect to individual locations. For example and without limitation, a touch sensing element can sense data or other information with respect to a relatively small region of where a user is contacting a touch device.

The text "force sensing element", and variants thereof, generally refers to one or more data sensing elements of any kind, including information sensed with respect to force-of-touch, whether at individual locations or otherwise. For example and without limitation, a force sensing element can sense data or other information with respect to a relatively small region of where a user is forcibly contacting a device.

The text "force of touch", and variants thereof, generally refers to a degree or measure of an amount of force being applied to a device. The degree or measure of an amount of force need not have any particular scale; for example, the measure of force-of-touch can be linear, logarithmic, or otherwise nonlinear, and can be adjusted periodically (or otherwise, such as aperiodically, or otherwise from time to time) in response to one or more factors, either relating to force-of-touch, location of touch, time, or otherwise.

After reading this application, those skilled in the art would recognize that these statements of terminology would be applicable to techniques, methods, physical elements, and systems (whether currently known or otherwise), including extensions thereof inferred or inferable by those skilled in the art after reading this application.

Overview

The present disclosure is generally related to a force sensing device that may be incorporated into a variety of electronic or computing devices, such as, but not limited to, computers, smart phones, tablet computers, track pads, and so on. The force sensing device may be used to detect one or more user force inputs on an input surface and then a processor (or processing element) may correlate the sensed inputs into a force measurement and provide those inputs to the computing device. In some embodiments, the force sensing device may be used to determine force inputs to a track pad, a display screen, or other input surface.

The force sensing device may include an input surface, a force sensing module, a substrate or support layer, and optionally a sensing layer that may detect another input characteristic than the force sensing layer. The input surface provides an engagement surface for a user, such as the external surface of a track pad or the cover glass for a display. In other words, the input surface may receive one or more user inputs directly or indirectly.

The force sensing module may be any suitable type of force sensing module, such as (but not limited to) an ultrasonic force-sensing module, a capacitive force-sensing module, a resistive force-sensing module, an optical force-sensing module, a pyro-electric force sensing module, and so on.

In embodiments where it is present, the sensing layer may be configured to sense characteristics different from the force sensing module. For example, the sensing layer may include capacitive sensors or other sensing elements. In a specific implantation, a multi-touch sensing layer may be incorporated into the force sensing device and may be used to enhance data regarding user inputs. As an example, touch inputs detected by the sense layer may be used to further refine the force input location, confirm the force input location, and/or correlate the force input to an input location. In the last example, the force sensitive device may not use the capacitive sensing of the force sensing device to estimate a location, which may reduce the processing required for the force sensing device. Additionally, in some embodiments, a touch sensitive device may be used to determine force inputs for a number of different touches. For example, the touch positions and force inputs may be used to estimate the input force at each touch location.

In one embodiment, techniques can include providing a force sensitive sensor incorporated into a touch device. For example, a force sensitive sensor can include an ultrasound device or capacitive device which can infer a measure of how forcefully a user is pressing, pushing, or otherwise contacting a touch device in response to a signal from the force sensitive sensor. In such cases, the signal from the force sensitive sensor for the particular user is compared with a baseline value, with the effect of obtaining a measure of actual force. In one embodiment, the signal from the force sensitive sensor at a selected time determines the baseline against which it can compare when measuring that amount of force, with the effect that the force sensitive sensor can infer how forcefully the particular user is pressing, pushing, or otherwise contacting the touch device. This has the effect that the force sensitive sensor can determine a measure of that amount of force, notwithstanding a difference in the signal from the force sensitive sensor in response to different users.

In one embodiment, the force sensitive sensor determines a time-varying signal in response to a measure of force of touch from a user, and in response to that time-varying signal, determines a baseline against which to measure that force of touch. For example, in one embodiment, the force sensitive sensor determines that time-varying measure of force of touch, computes a first time derivative of that measure of force of touch, determines a peak in that time derivative, and computes a baseline in response to that peak. In one embodiment, the force sensitive sensor determines an amount of that peak, that is, a time-varying change in the measure of force of touch, computes a selected fraction of the amount of that peak, sets a baseline value in response to that selected fraction, and determines a subjective degree of touch for users in response to different baseline values for different users. For example, those users who press relatively slowly when they contact the touch device would have a relatively slow rise time in absolute pressure against the surface of the touch device, while those users who press relatively rapidly when they contact the touch device would have a relatively fast rise time in that absolute pressure. However, the inventors have found that absolute pressure at a selected fraction of the peak of the derivative of pressure is relatively constant, with the effect of providing a stable baseline against which to measure force of touch. While this application primarily describes embodiments in which ultrasound and ultrasonic sensors are used to determine an amount of applied force, or a force of touch, in the context of the invention, there is no particular requirement for any such limitation. For example, techniques described herein can be applied with any method where there can be an initial relatively large signal on contact, followed by a relatively smaller force-sensitive change. In one such case, techniques described herein can be applied with frustrated total internal reflection (FTIR) to infer force. In another such case techniques described herein can be applied with using a capacitive signal, or a total capacitive signal, to infer force, such as when the capacitive signal increases with increased amount the user pushes on a touch device.

Force Sensitive Device and System

Figure 1B:
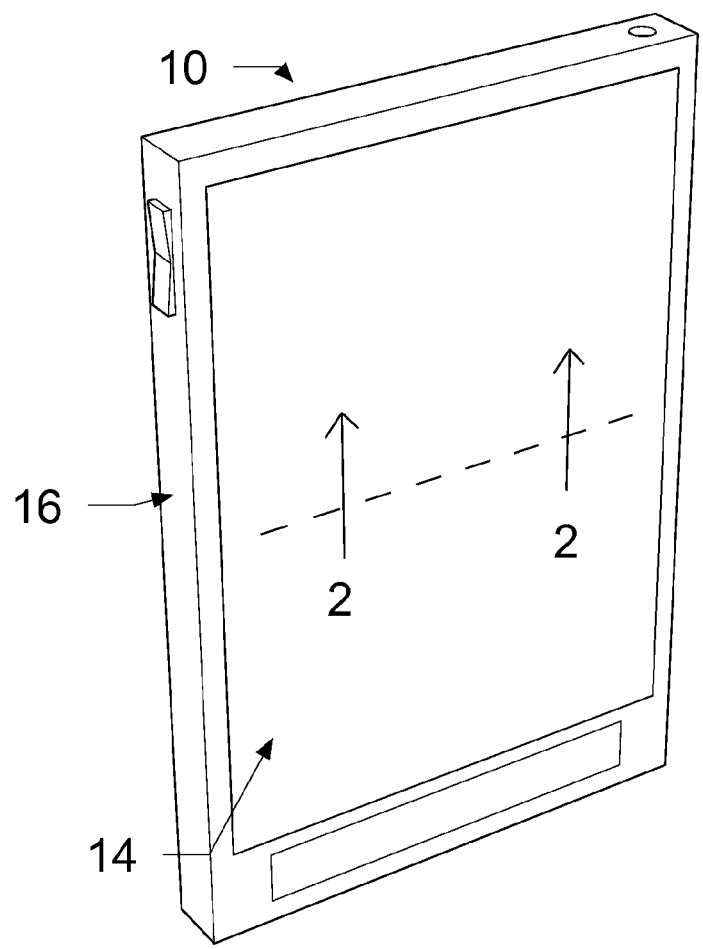
FIG. 1B is a front perspective view of a second example of a computing device incorporating a force sensing device.
Figure 1C:
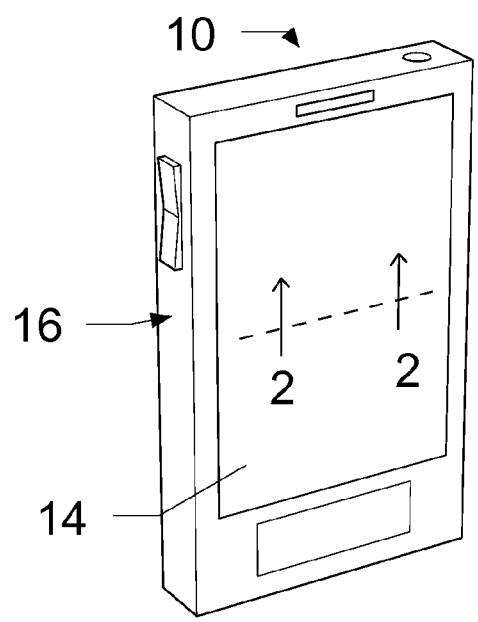
FIG. 1C is a front elevation view of a third example of a computing device incorporating the force sensing device.

Turning now to the figures, illustrative electronic devices that may incorporate the force sensing device will be discussed in more detail. FIGS. 1A-1C illustrate various computing or electronic devices that may incorporate the force sensing device. With reference to FIG. 1A, the force sensing device may be incorporated into a computer 10, such as a laptop or desktop computer. The computer 10 may include a track pad 12 or other input surface, a display 14, and an enclosure 16 or frame. The enclosure 16 may extend around a portion of the track pad 12 and/or display 14. In the embodiment illustrated in FIG. 1A, the force sensing device may be incorporated into the track pad 12, the display 14, or both the track pad 12 and the display 14. In these embodiments, the force sensing device may be configured to detect force inputs to the track pad 12 and/or the display 14.

In some embodiments, the force sensing device may be incorporated into a tablet computer. FIG. 1B is a top perspective view of a tablet computer including the force sensing device. With reference to FIG. 1B, the table computer 10 may include the display 14 where the force sensing device is configured to detect force inputs to the display 14. In addition to the force sensing device, the display 14 may also include one or more touch sensors, such as a multi-touch capacitive grid, or the like. In these embodiments, the display 14 may detect both force inputs, as well as position or touch inputs.

In yet other embodiments, the force sensing device may be incorporated into a mobile computing device, such as a smart phone. FIG. 1C is a perspective view of a smart phone including the force sensing device. With reference to FIG. 1C, the smart phone 10 may include a display 14 and a frame or enclosure 16 substantially surrounding a perimeter of the display 14. In the embodiment illustrated in FIG. 1C, the force sensing device may be incorporated into the display 14. Similarly to the embodiment illustrated in FIG. 1B, in instances where the force sensing device may be incorporated into the display 14, the display 14 may also include one or more position or touch sensing devices in addition to the force sensing device.

Figure 2:
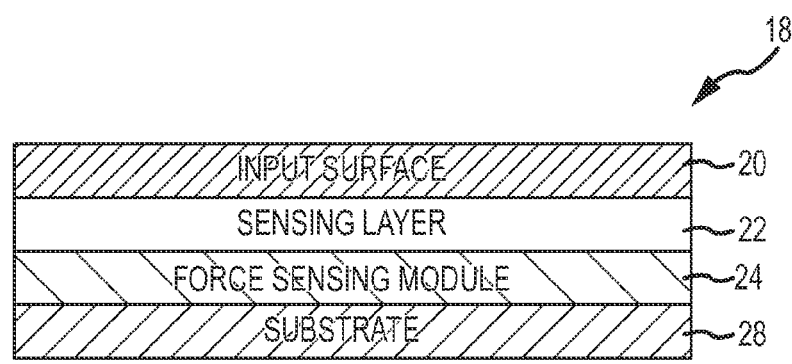
FIG. 2 is a simplified cross-section view of the computing device taken along line 2-2 in FIG. 1A.

The force sensing device will now be discussed in more detail. FIG. 2 is a simplified cross-section view of the electronic device taken along line 2-2 in FIG. 1A. With reference to FIG. 2, the force sensing device 18 may include an input surface 20, a sensing layer 22, a force sensing module 24 or layer, and a substrate 28. As discussed above with respect to FIGS. 1A-1C, the input surface 20 may form an exterior surface (or a surface in communication with an exterior surface) of the track pad 12, the display 14, or other portions (such as the enclosure) of the computing device 10. In some embodiments, the input surface 20 may be at least partially translucent. For example, in embodiments where the force sensing device 18 is incorporated into a portion of the display 14.

The sensing layer 22 may be configured to sense one or more parameters correlated to a user input. In some embodiments, the sensing layer 22 may be configured to sense characteristics or parameters that may be different from the characteristics sensed by the force sensing module 24. For example, the sensing layer 22 may include one or more capacitive sensors that may be configured to detect input touches, e.g., multi-touch input surface including intersecting rows and columns. The sensing layer 22 may be omitted where additional data regarding the user inputs may not be desired. Additionally, the sensing layer 22 may provide additional data that may be used to enhance data sensed by the force sensing module 24 or may be different from the force sensing module. In some embodiments, there may be an air gap between the sensing layer 22 and the force sensing module 24. In other words, the force sensing module 24 and sensing layer may be spatially separated from each other defining a gap or spacing distance.

The substrate 28 may be substantially any support surface, such as a portion of an printed circuit board, the enclosure 16 or frame, or the like. Additionally, the substrate 28 may be configured to surround or at least partially surround one more sides of the sensing device 18.

In some embodiments, a display (e.g., a liquid crystal display) may be positioned beneath the input surface 20 or may form a portion of the input surface 20. Alternatively, the display may be positioned between other layers of the force sensing device. In these embodiments, visual output provided by the display may be visible through the input surface 20.

Figure 3:
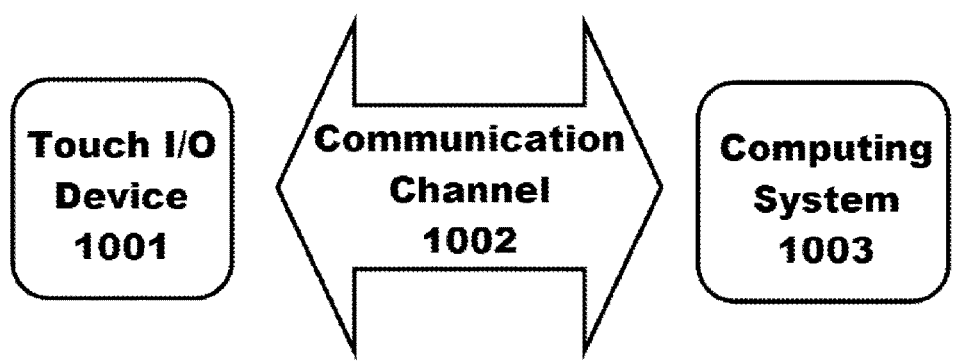
FIG. 3 shows a conceptual drawing of communication between a touch I/O device and a computing system.
Figure 4:
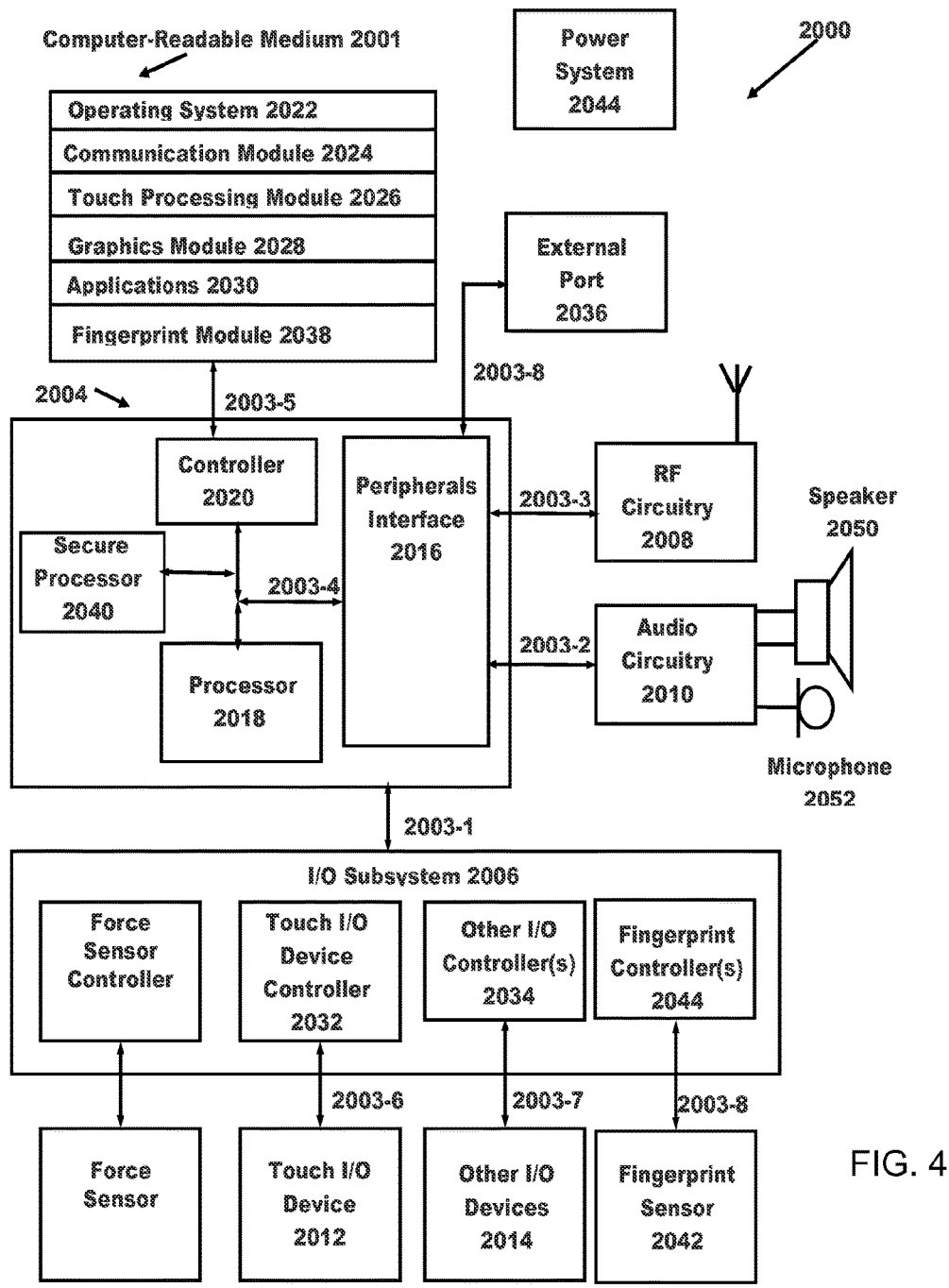
FIG. 4 shows a conceptual drawing of a system including a force sensitive touch device.

As generally discussed above, the force sensing device may be incorporated into one or more touch sensitive device. FIG. 3 shows a conceptual drawing of communication between a touch I/O device and a computing system. FIG. 4 shows a conceptual drawing of a system including a force sensitive touch device.

Described embodiments may include touch I/O device 1001 that can receive touch input and force input (such as possibly including touch locations and force of touch at those locations) for interacting with computing system 1003 (such as shown in the FIG. 1) via wired or wireless communication channel 1002. Touch I/O device 1001 may be used to provide user input to computing system 1003 in lieu of or in combination with other input devices such as a keyboard, mouse, or possibly other devices. In alternative embodiments, touch I/O device 1001 may be used in conjunction with other input devices, such as in addition to or in lieu of a mouse, trackpad, or possibly another pointing device. One or more touch I/O devices 1001 may be used for providing user input to computing system 1003. Touch I/O device 1001 may be an integral part of computing system 1003 (e.g., touch screen on a laptop) or may be separate from computing system 1003.

Touch I/O device 1001 may include a touch sensitive and force sensitive panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard, disposed on a trackpad or other pointing device), any multi-dimensional object having a touch sensitive surface for receiving touch input, or another type of input device or input/output device.

In one example, touch I/O device 1001 embodied as a touch screen may include a transparent and/or semitransparent touch sensitive and force sensitive panel at least partially or wholly positioned over at least a portion of a display. (Although the touch sensitive and force sensitive panel is described as at least partially or wholly positioned over at least a portion of a display, in alternative embodiments, at least a portion of circuitry or other elements used in embodiments of the touch sensitive and force sensitive panel may be at least positioned partially or wholly positioned under at least a portion of a display, interleaved with circuits used with at least a portion of a display, or otherwise.) According to this embodiment, touch I/O device 1001 functions to display graphical data transmitted from computing system 1003 (and/or another source) and also functions to receive user input. In other embodiments, touch I/O device 1001 may be embodied as an integrated touch screen where touch sensitive and force sensitive components/devices are integral with display components/devices. In still other embodiments a touch screen may be used as a supplemental or additional display screen for displaying supplemental or the same graphical data as a primary display and to receive touch input, including possibly touch locations and force of touch at those locations.

Touch I/O device 1001 may be configured to detect the location of one or more touches or near touches on device 1001, and where applicable, force of those touches, based on capacitive, resistive, optical, acoustic, inductive, mechanical, chemical, or electromagnetic measurements, in lieu of or in combination or conjunction with any phenomena that can be measured with respect to the occurrences of the one or more touches or near touches, and where applicable, force of those touches, in proximity to device 1001. Software, hardware, firmware or any combination thereof may be used to process the measurements of the detected touches, and where applicable, force of those touches, to identify and track one or more gestures. A gesture may correspond to stationary or non-stationary, single or multiple, touches or near touches, and where applicable, force of those touches, on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, consecutively, or otherwise. A gesture may be characterized by, but is not limited to a pinching, sliding, swiping, rotating, flexing, dragging, tapping, pushing and/or releasing, or other motion between or with any other finger or fingers, or any other portion of the body or other object. A single gesture may be performed with one or more hands, or any other portion of the body or other object by one or more users, or any combination thereof.

Computing system 1003 may drive a display with graphical data to display a graphical user interface (GUI). The GUI may be configured to receive touch input, and where applicable, force of that touch input, via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs or dials, virtual buttons, virtual levers, any virtual UI, and the like. A user may perform gestures at one or more particular locations on touch I/O device 1001 which may be associated with the graphical elements of the GUI. In other embodiments, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input, and where applicable, force of that touch input, on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches, and where applicable, force of those touches, on touch I/O device 1001. Feedback may be transmitted optically, mechanically, electrically, olfactory, acoustically, haptically, or the like or any combination thereof and in a variable or non-variable manner.

Attention is now directed towards embodiments of a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other (portable or non-portable) system or device adaptable to the inclusion of system architecture 2000, including combinations of two or more of these types of devices. FIG. 4 is a block diagram of one embodiment of system 2000 that generally includes one or more computer-readable mediums 2001, processing system 2004, Input/Output (I/O) subsystem 2006, electromagnetic frequency circuitry, such as possibly radio frequency (RF) or other frequency circuitry 2008 and audio circuitry 2010. These components may be coupled by one or more communication buses or signal lines 2003. Each such bus or signal line may be denoted in the form 2003-X, where X can be a unique number. The bus or signal line may carry data of the appropriate type between components; each bus or signal line may differ from other buses/lines, but may perform generally similar operations.

It should be apparent that the architecture shown in FIGS. 3 and 4 are only one example architecture of system 2000, and that system 2000 could have more or fewer components than shown, or a different configuration of components. The various components shown in FIGS. 3 and 4 can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some embodiments, audio circuitry 2010 includes a headphone jack (not shown).

Peripherals interface 2016 couples the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some embodiments, the software components include operating system 2022, communication module (or set of instructions) 2024, touch and force-of-touch processing module (or set of instructions) 2026, graphics module (or set of instructions) 2028, one or more applications (or set of instructions) 2030, and fingerprint sensing module (or set of instructions) 2038. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In embodiments in which touch I/O device 2012 is a touch sensitive and force sensitive display (e.g., touch screen), graphics module 2028 includes components for rendering, displaying, and animating objects on the touch sensitive and force sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system, also sometimes referred to herein as "GPS"), a music player, and otherwise.

Touch and force-of-touch processing module 2026 includes various software components for performing various tasks associated with touch I/O device 2012 including but not limited to receiving and processing touch input and force-of-touch input received from I/O device 2012 via touch I/O device controller 2032.

System 2000 may further include fingerprint sensing module 2038 for performing the method/functions as described herein in connection with other figures shown and described herein.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input and force-of-touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch-sensitive and force-sensitive surface that accepts touch input and force-of-touch input from the user. Touch I/O device 2012 and touch screen controller 2032 (along with any associated modules and/or sets of instructions in medium 2001) detects and tracks touches or near touches, and where applicable, force of those touches (and any movement or release of the touch, and any change in the force of the touch) on touch I/O device 2012 and converts the detected touch input and force-of-touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad or trackpad), the user may indirectly interact with graphical objects that are displayed on a separate display screen embodied as I/O device 2014.

Touch I/O device 2012 may be analogous to the multi-touch sensitive surface described in the following U.S. Pat. Nos. 6,323,846; 6,570,557; and/or 6,677,932; and/or U.S. Patent Publication 2002/0015024A1, each of which is hereby incorporated by reference.

Embodiments in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 2012 based on the user's touch, and force-of-touch, input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 2016, one or more processors 2018, and memory controller 2020 may be implemented on a single chip, such as processing system 2004. In some other embodiments, they may be implemented on separate chips.

Further System Elements

In one embodiment, an example system includes a force sensor coupled to the touch I/O device 2012, such as coupled to a force sensor controller. For example, the force sensor controller can be included in the I/O subsystem 2006. The force sensor controller can be coupled to the processor 2018 and (optionally) the secure processor 2040, with the effect that information from the force sensor controller can be measured, calculated, computed, or otherwise manipulated.

In one embodiment, the force sensor determines a measure of force-of-touch from a user contacting the touch I/O device 2012. The force sensor can provide a signal indicating a measure of force-of-touch.

For example, the force sensor can include an ultrasound-based force measurement system, in which an ultrasonic pulse is generated below a surface of the touch I/O device 2012, and in which the ultrasonic pulse is reflected from that surface of the touch I/O device 2012, with the effect of providing a reflected signal amplitude.

In one embodiment, as described herein, the reflected signal amplitude is responsive to an amount of applied force provided by a user, in which the user contacts the surface of the touch I/O device 2012 (such as by pressing, pushing, or otherwise contacting that surface). In one embodiment, as described herein, the reflected signal amplitude is relatively larger when the amount of applied force provided by the user is relatively larger.

For example, the amount of applied force provided by the user might vary from approximately zero grams of force to approximately five hundred (500) grams of force, where approximately fifty (50) grams of force represents an example set point at which the user is considered by the force measurement system to be actually contacting the touch I/O device 2012. However, in the context of the invention, there is no particular requirement for any such limitation. Distinct and other values of the amount of applied force might be applied by the user, and distinct and values of the amount of applied force might be used as an example set point at which the user is considered by the force measurement system to be actually contacting the touch I/O device 2012. These particular values should be considered merely exemplary.

In one embodiment, the signal provided by the force sensor includes a time varying signal, in which a measure of force-of-touch varies substantially continuously with time. For example, when a user contacts the touch I/O device 2012, the measure of force-of-touch increases as the user presses more forcefully on the touch I/O device 2012, and decreases as the user releases the contact. However, in the context of the invention, there is no particular requirement for any such limitation. For example, the time varying signal might vary only at designated times, such as at the changing of a clock signal, on the occurrence of one or more selected events, periodically or aperiodically, or otherwise from time to time.

In one embodiment, the signal provided by the force sensor can include an analog signal indicating a measure of reflected signal amplitude. However, in the context of the invention, there is no particular requirement for any such limitation. For example, the time varying signal might be encoded using a pulse width coding technique or other pulse coding technique, an analog-to-digital encoding technique or other digital encoding technique, or otherwise.

In one embodiment, the signal provided by the force sensor can be received and processed by a computing device, such as the processor 2018 or (optionally) the secure processor 2040. The processor 2018 or (optionally) the secure processor 2040 can determine, in response to the signal provided by the force sensor, one or more values indicating an amount of force of touch by the user. In one embodiment, the one or more values can include a baseline value, indicating an amount of force of touch by the user considered to be relatively consistent, such as about 50 grams of force (or alternatively, an amount of force that would be provided by a 50 gram weight resting on the touch I/O device 2012).

Example Force-of-Touch Signals

Figure 5:
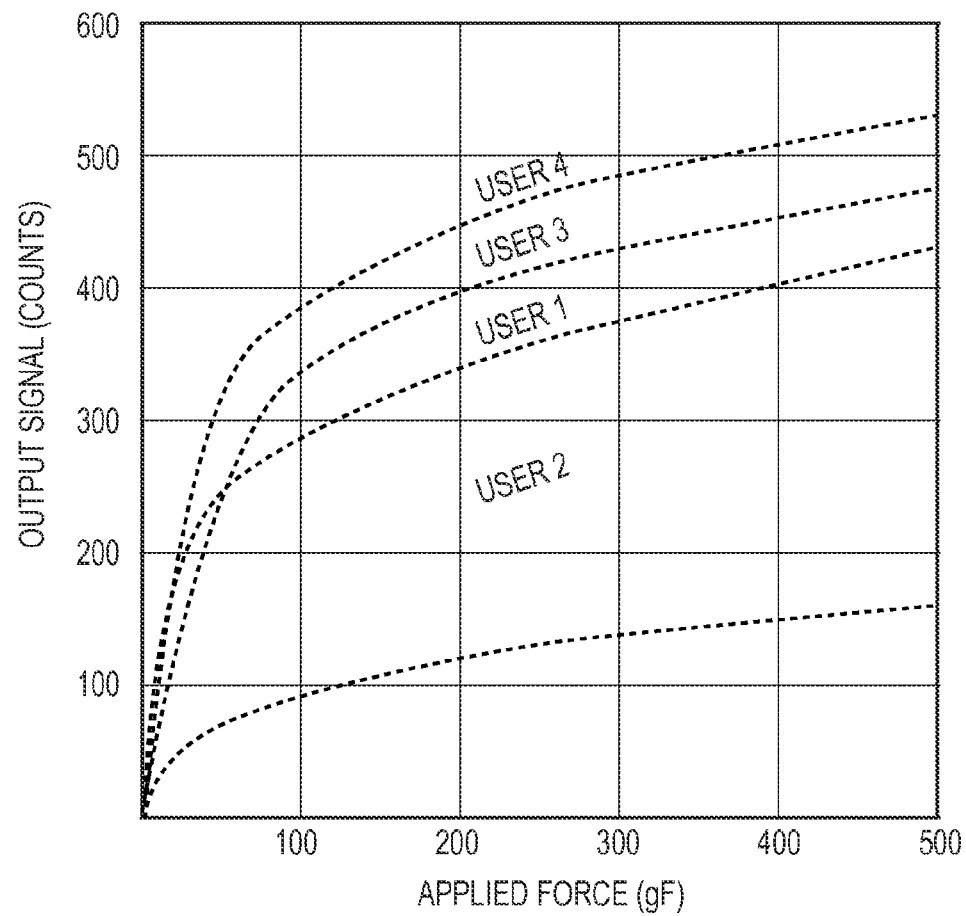
FIG. 5 shows a conceptual drawing of a simulated example set of measured ultrasonic signal amplitude versus force of touch.

FIG. 5 shows a conceptual drawing of a simulated example set of measured ultrasonic signal amplitude versus force of touch.

In a simulated example of measured ultrasonic signal amplitude versus force of touch, a reflected signal amplitude is shown as being responsive to an applied force of touch by the user. In the example, the simulated reflected signal amplitude is shown as measured in counts of the measuring device, while the simulated applied force of touch is shown as measured in grams. However, in the context of the invention, there is no particular requirement for using these or any other particular units.

In the simulated example, the amount indicated by the reflected signal amplitude at an initial touch force of 50 grams can vary from between about a 75 count signal amplitude, as might be detected by a sense amplifier, to about a 350 count signal amplitude. Similarly, the amount indicated by the signal amplitude might be anywhere from about a 175 count signal amplitude, to about a 525 count signal amplitude, when the force-of-touch is approximately 500 grams of force, again depending upon the particular user. In this description a count signal amplitude indicates a digital value of the reflected signal amplitude, after that reflected signal amplitude has been converted from an analog value to a digital value by an analog-to-digital converter.

In the simulated example, for each particular user, an increase in the amount of applied force produces an increase in the signal amplitude. As noted above, the measured value of the reflected signal amplitude at an applied force of 50 grams can vary significantly depending upon the particular user. As seen in the figure, the difference in the measured value of the signal amplitude between an applied force of 50 grams and an applied force of 500 grams can also vary significantly depending upon the particular user.

For example, the measured amount of force can be nonlinear with respect to displacement of the user's finger with respect to a surface of the touch device 2012. For example, there could be effectively no signal until the user's finger actually contacts the touch device 2012. At a time of contact, and for a relatively short duration thereafter, the reflected signal amplitude, or other signal indicating force, can increase relatively rapidly. After some amount of force is applied, the signal can behave relatively more linearly in response to the amount of actual force.

In the simulated example, there can be two regions of signal received in the duration of a touch. In a first region of the signal, when the touch is between about 0 grams and about 50 grams, the signal can vary quite rapidly, while in a second region of the signal, when the touch is between about 50 grams and about 500 grams, the signal can vary much more linearly with the amount of applied force. In the simulated example, there would be relatively great variability between users at about 50 grams of applied force, but the slope of signal response to applied force between about 50 grams and about 500 grams would be relatively consistent. This has the effect that subtracting a value for the signal at about 50 grams applied force would provide a reasonable measure of actual force. In the simulated example, the time derivative of the signal is greatest at the time of the initial touch. After the signal is changing more slowly, that is, once the time derivative of the signal is about 80% of its peak value, the signal will be within that part of the signal-to-applied-force response curve that is relatively linear, with the effect of providing a relatively good baseline for an inferred amount of applied force. In alternative embodiments, a baseline may be chosen when the second time derivative of the signal is at its most negative, with the effect of selecting the time when the signal-to-applied-force response curve is beginning to flatten.

Figure 6A:
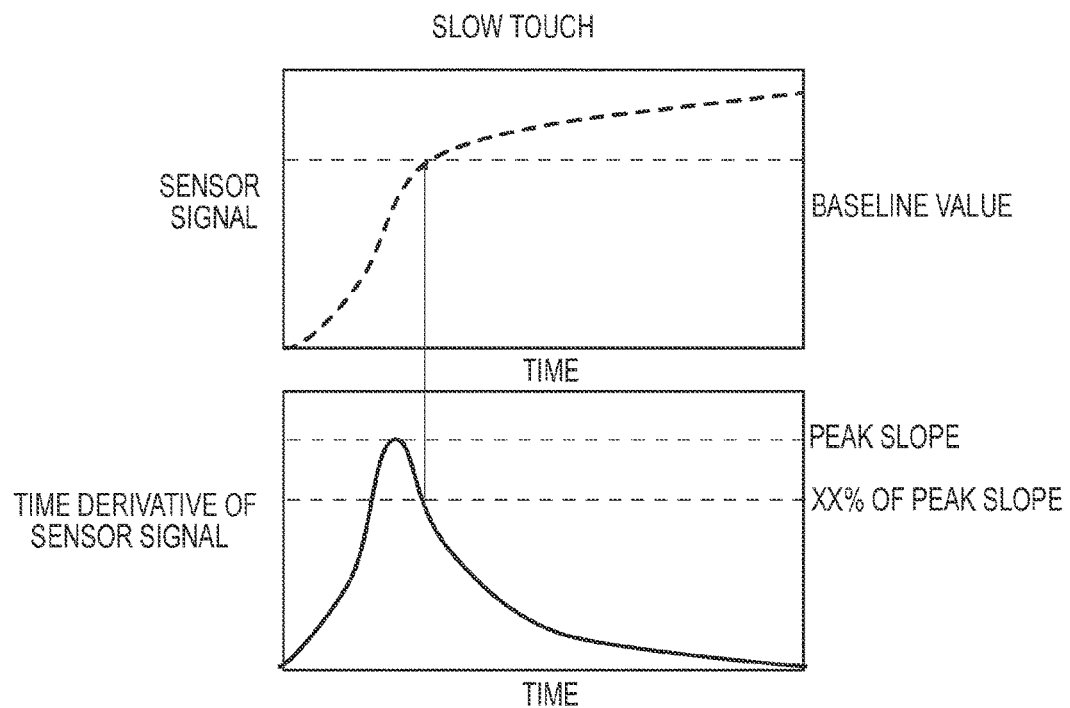
FIG. 6A shows a conceptual drawing of relatively slow pressure against the touch device.

FIG. 6A shows a conceptual drawing of relatively slow pressure against the touch device.

Figure 6B:
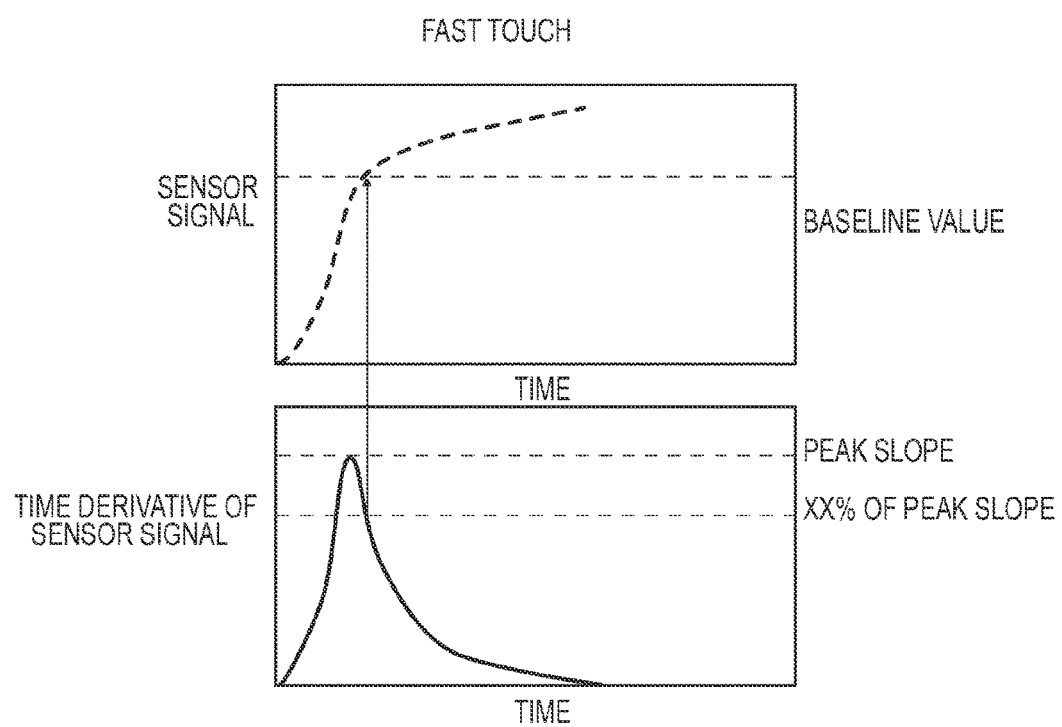
FIG. 6B shows a conceptual drawing of relatively fast pressure against the touch device.

FIG. 6B shows a conceptual drawing of relatively fast pressure against the touch device.

For a first example, as shown in the FIG. 6A, a relatively slow touch of the touch I/O device 2012 produced a relatively slow rise in applied force, and a relative slow rise in reflected signal amplitude (Vpp). For a second example, as shown in the FIG. 6B, a relatively fast touch of the touch I/O device 2012 produced a relatively fast rise in applied force, and a relative fast rise in reflected signal amplitude (Vpp).

In the first example, the rise in reflected signal amplitude (Vpp), produced a time varying signal indicating reflected signal amplitude, and a time derivative of that first time varying signal. Similarly, in the second example, the rise in reflected signal amplitude (Vpp), produced a time varying signal indicating reflected signal amplitude, and a time derivative of that second time varying signal. In each example, the time derivative is the first derivative of the time varying signal with respect to time.

In the example, the time derivative of each time varying signal, as shown in the FIG. 4A and in the FIG. 6B is seen to rise relatively rapidly to a peak value, and to decrease from that peak value, trailing off after a time duration. A baseline value for the amount of force of touch can be determined at a time after that peak value has passed, and has decreased to a selected fraction thereof, such as 80% of that peak value.

In one embodiment, the processor 2018 or (optionally) the secure processor 2040 can determine, in response to the signal provided by the force sensor, a peak value of the time varying signal, a time at when the peak value occurs, a selected fraction of the peak value, such as 80% thereof, and a time at when that selected fraction of the peak value occurs after the peak value.

In one embodiment, the processor 2018 or (optionally) the secure processor 2040 can determine a baseline value for the reflected signal amplitude (Vpp) in response to that selected fraction of the peak value, and can treat an amount of force of touch by the user in response to the actual reflected signal amplitude (Vpp) and in response to that baseline value. For a first example, if the actual reflected signal amplitude (Vpp) is less than that baseline value, the processor 2018 or (optionally) the secure processor 2040 can treat the amount of force of touch by the user as less than the baseline amount of force of about 50 grams. For a second example, if the actual reflected signal amplitude (Vpp) exceeds that baseline value, the processor 2018 or (optionally) the secure processor 2040 can treat the amount of force of touch by the user as exceeding the baseline amount of force.

In one embodiment, the processor 2018 or (optionally) the secure processor 2040 can determine the amount of force of touch by the user in response to a comparison between the time varying signal and the baseline value. For example, the processor 2018 can compute a difference between (or alternatively, a ratio or another function of those values) the time varying signal and the baseline value, and can determine the amount of force of touch by the user in response to a look up table, a sigmoid curve, or other function of that difference.

In alternative embodiments, the processor 2018 may determine in response to the signal provided by the force sensor, a second derivative of the time varying signal, a set of inflection points for that time varying signal, a peak value of the time varying signal, a time at when the peak value occurs, and an inflection point after that peak value. In such alternative embodiments, the processor 2018 may determine one or more baseline values in response to one or more such inflection points.

Method of Operation

Figure 7:
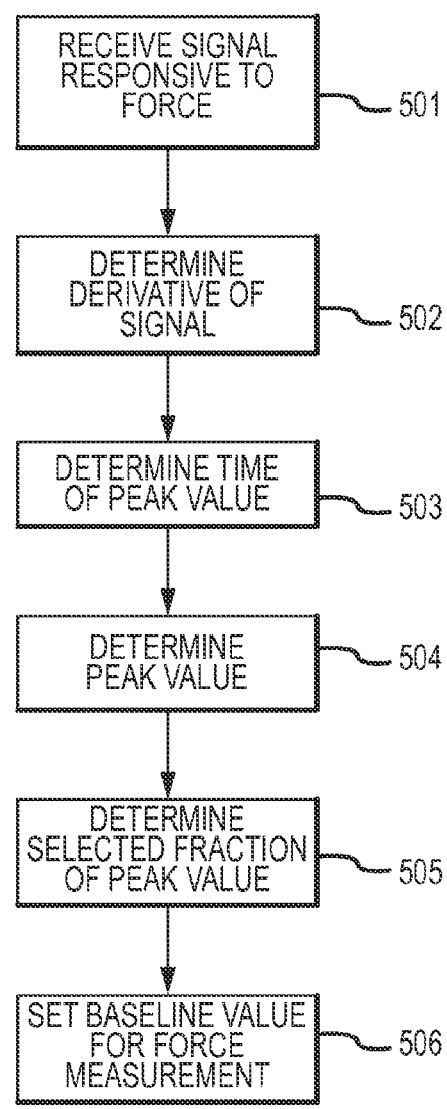
FIG. 7 shows a conceptual drawing of a method of determining a baseline value for force of touch.

FIG. 7 shows a conceptual drawing of a method of determining a baseline value for force of touch.

The method includes a set of flow points and a set of method steps. Although the flow points and method steps are shown in the figure in a sequential order, in the context of the invention, there is no particular requirement for any such limitation. For example, the method steps can be performed in a different order, in parallel or in a pipelined manner, or otherwise.

At a step 501, the method receives a signal responsive to an amount of force of touch by a user. For example, the signal can include a reflected signal amplitude (Vpp) from an ultrasound-based sensor, in response to a reflection from the user's finger touching a front surface of the touch I/O device 2012.

At a step 502, the method determines a first time derivative of the received signal. As described above, while the method is primarily described herein with respect to a first time derivative, in the context of the invention, there is no particular requirement for any such limitation. For example, the method may alternatively determine a second time derivative, or a spatial derivative, or another transformation of the received signal.

At a step 503, the method determines a time for a peak value for the derivative of the received signal. For example, the method can determine a peak value using a peak detector, or at a time when the second derivative of the received signal is substantially zero, or otherwise.

At a step 504, the method determines a value associated with that time, that is, the peak value for the derivative of the received signal. While the method is primarily described herein with respect to a peak value of the derivative of the received signal, in the context of the invention, there is no particular requirement for any such limitation. For example, the method may alternatively determine a value at an inflection point (in response to a second derivative of the received signal), or a value near to a peak value of the derivative of the received signal, or otherwise.

At a step 505, the method determines a selected fraction of the peak value for the derivative of the received signal, such as 80% of that peak value.

At a step 506, the method sets the baseline value equal to the signal at the time that selected fraction of the peak value occurs. This has the effect that the baseline value should be relatively the same, independent of the particular user generating that amount of force. The baseline value can be set to indicate zero force, or to indicate a selected value such as 50 grams of force. After this step, the method has been completed, and the baseline value can be used by the sensor for determining an amount of force of touch.

While the method is primarily described herein with respect to a time varying signal of an ultrasonic sensor, in the context of the invention, there is no particular requirement for any such limitation. For example, the method can be used with respect to a signal from a different type of sensor, such as a frustrated total internal reflection touch sensor or a capacitive touch sensor.

Timing Diagram

Figure 8A:
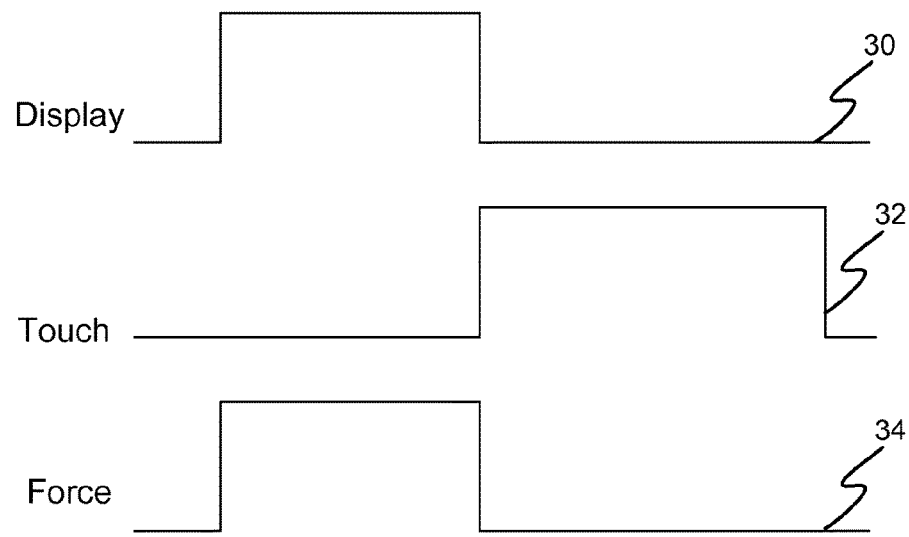
FIG. 8A is a first example of a timing diagram for the computing device.
Figure 8B:
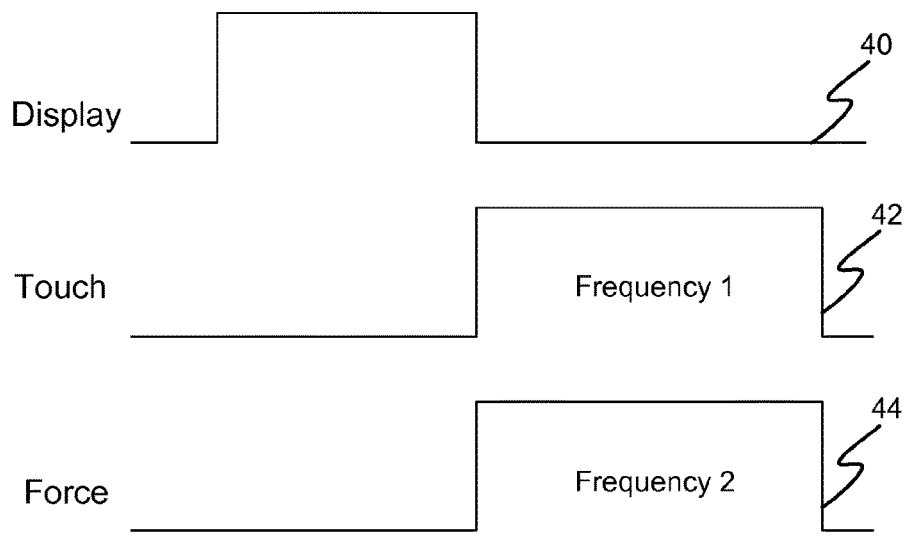
FIG. 8B is a second example of a timing diagram for the computing device.
Figure 8C:
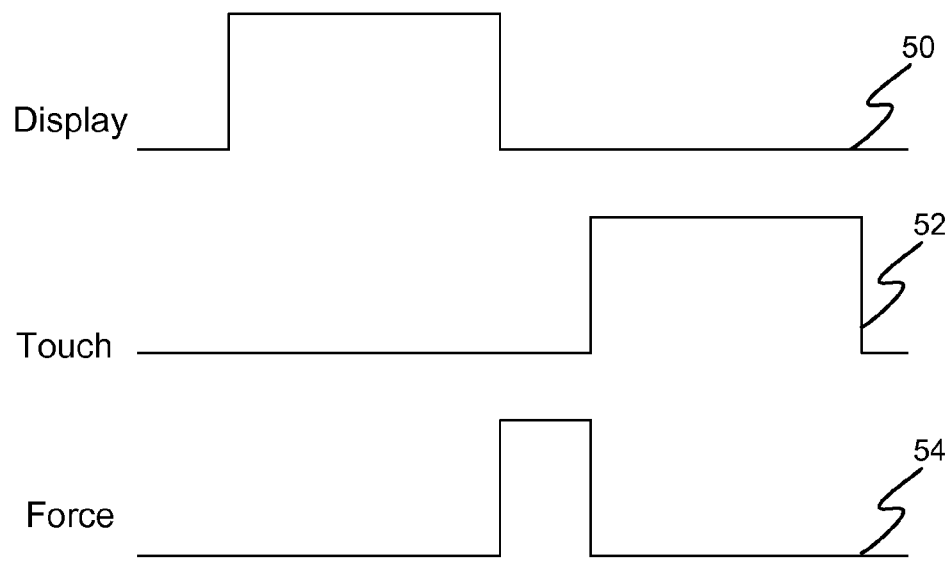
FIG. 8C is a third example of a timing diagram for the computing device.

In some embodiments various components of the computing device and/or touch screen device may be driven or activated separately from each other and/or on separate frequencies. Separate drive times and/or frequencies for certain components, such as the display, touch sensor or sensors (if any), and/or force sensors may help to reduce cross-talk and noise in various components. FIGS. 8A-8C illustrate different timing diagram examples, each will be discussed in turn below. It should be noted that the timing diagrams discussed herein are meant as illustrative only and many other timing diagrams and driving schemes are envisioned.

With respect to FIG. 8A, in some embodiments, the display 14 and the force sensor 18 may be driven substantially simultaneously, with the touch sensitive component 1001 being driven separately. In other words, the driver circuits for the force sensing device 18 may be activated during a time period that the display is also activated. For example, the display signal 30 and the force sensing signal 34 may both be on during a first time period and then may both inactive as the touch sensing device signal 32 is activated.

With respect to FIG. 8B, in some embodiments, the touch and force devices may be driven at substantially the same time and the display may be driven separately. For example, the display signal 40 may be set high (e.g., active) during a time that the touch signal 42 and the force signal 44 may both be low (e.g., inactive), and the display signal 40 may be low while both the touch signal 42 and the force signal 44 are high. In this example, the touch signal 42 and the force signal 44 may have different frequencies. In particular, the touch signal 42 may have a first frequency F1 and the force signal 44 may have a second frequency F2. By utilizing separate frequencies F1 and F2, the computing device may be able to sample both touch inputs and force inputs at substantially the same time without one interfering with the other, which in turn may allow the processor to better correlate the touch inputs and the force inputs. In other words, the processor may be able to correlate a force input to a touch input because the sensors may be sampling at substantially the same time as one another. Additionally, the separate frequencies may reduce noise and cross-talk between the two sensors. Although the example in FIG. 8B is discussed with respect to the force and touch signals, in other embodiments each of the drive signal, the touch signal, and/or the force signal may have separate frequencies from each other and may be activated simultaneously or correspondingly with another signal.

With respect to FIG. 8C, in some embodiments, various components in the computing device may be driven separately from one another. For example, the display signal 50 may be driven high, while both the touch signal 52 and the force signal 54 are low. Additionally, the touch signal 52 may be high while both the force signal 54 and the display signal 50 are low and similarly the force signal 54 may be high while both the display signal 50 and the touch signal 52 are low. In these examples, the force signal's active period may be positioned between the active periods of the display and the touch sensor. In other words, the force sensor 18 may be driven between the display being driven and the touch sensors being driven. In these examples, each of the devices may be active at separate times from one another, thereby reducing inter-system noise. In some embodiments, the force sensor may have a shorter drive time than the display or touch signals; however, in other embodiments, the force sensor may have a drive time that is substantially the same as or longer than the display and/or touch sensor.

Alternative Embodiments

Although embodiments have been described herein with respect to ultrasound-based force sensing and/or sensors, it should be appreciated that capacitive-based force sensing and/or sensors may be employed in certain embodiments.

After reading this application, those skilled in the art would recognize that techniques for recognizing navigation information associated with portions of fingerprint images, and using that associated navigation information to aid with combining those portions of fingerprint images into unified fingerprint images is responsive to, and transformative of, real-world data such as fingerprint image data received from a user's fingerprint, and provides a useful and tangible result in the service of enrolling and comparing fingerprints in a biometric security context. Moreover, after reading this application, those skilled in the art would recognize that processing of fingerprint data by a computing device includes substantial computer control and programming, involves substantial records of fingerprint information, and involves interaction with fingerprint sensing hardware and optionally a user interface for fingerprint enrollment and authentication.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

The invention claimed is:

1. An apparatus comprising:
  a touch device including one or more force of touch sensors, the force of touch sensors being capable of providing a time-varying signal with respect to a force of touch on the touch device;
  one or more processors having access to the time-varying signal, the one or more processors configured to:
    calculate a derivative of the time-varying signal;
    calculate a baseline value associated with a particular user, the baseline value based on the time-varying signal and the derivative of the time-varying signal, and the baseline value being a value of the time-varying signal at a time after a peak value of the derivative of the time-varying signal;
    cause the baseline value for the particular user to be stored in the apparatus;
    compare one or more values indicative of a force of touch against the baseline value for the particular user; and
  distinguish between a first type of touch having less force of touch than the baseline value for the particular user, and a second type of touch having more force than the baseline value for the particular user.

2. The apparatus as in claim 1, wherein:
  the one or more processors have access to instructions, the instructions directing the one or more processors to determine a measure of actual force in response to a comparison of one or more values indicative of force of touch to the baseline value for the particular user.

3. The apparatus as in claim 1, wherein:
  the one or more processors have access to instructions, the instructions directing the one or more processors
  to provide one or more first functions of the touch device in response to the first type of touch; and
  to provide one or more second functions of the touch device in response to the second type of touch;
  wherein the first functions are distinct from the second functions.

4. The apparatus as in claim 1, wherein:
  the value of the time-varying signal corresponds to a selected fraction of the peak value of the derivative of the time-varying signal.

5. The apparatus as in claim 1, wherein:
  the baseline value is substantially constant for the particular user, despite a speed of the force of touch on the touch device.

6. The apparatus as in claim 1, wherein:
  the derivative of the time-varying signal is based on a first time derivative of the signal.

7. The apparatus as in claim 1, wherein:
  the force of touch sensors are sensors that provide data indicative of a measure of force of touch.

8. The apparatus as in claim 1, wherein:
  the force of touch sensors include at least one ultrasound device.

9. The apparatus as in claim 1 wherein:
  the force of touch sensors are ultrasound sensors configured to receive an internal reflection of an ultrasound signal.

10. An apparatus comprising:
  a touch device including one or more force of touch sensors, the force of touch sensors being capable of providing a time-varying signal responsive to a force of touch;
  one or more processors having access to the signal, the one or more processors having access to instructions, the instructions directing the processors to calculate a baseline value in response to the signal and a derivative of the signal, wherein the baseline value is substantially stable for a particular user and is a value of the signal at a time after a peak value of the derivative of the signal;

wherein the touch device is responsive to whether the force of touch exceeds the baseline value for the particular user and distinguishes between a first type of touch having less force of touch than the baseline value for the particular user, and a second type of touch having more force than the baseline value for the particular user.

11. The apparatus as in claim 10, wherein:
the processors have access to instructions directing the processors to distinguish a first particular user from a second particular user in response to the baseline value.

12. The apparatus as in claim 10, wherein:
the derivative of the time-varying signal comprises a first time derivative of the signal.

13. The apparatus as in claim 10, wherein:
the baseline value is substantially constant notwithstanding a speed of the force of touch on the touch device.

14. The apparatus as in claim 10, wherein:
the signal is related to a time-varying force of touch, the time-varying force of touch being responsive to a speed at which each particular user presses on the touch device.

15. The apparatus as in claim 14, wherein:
the baseline value is derived from, at least in part, an inflection point of the time-varying signal.

16. A method, including operations of:
providing, from one or more force of touch sensors, a time-varying signal with respect to a force of touch on a touch device including the force of touch sensors;
by one or more processors coupled to the touch device;
calculating a derivative of the time-varying signal;
calculating a baseline value associated with a particular user, the baseline value based on the time-varying signal and the derivative of the time-varying signal, and the baseline value being a value of the time-varying signal at a time after a peak value of the derivative of the time-varying signal;
storing the baseline value for the particular user in the touch device;
comparing one or more values indicative of a force of touch on the touch device to the baseline value for the particular user; and
by the touch device, distinguishing between a first type of touch having less force of touch than the baseline value for the particular user, and a second type of touch having more force than the baseline value for the particular user.

17. The method as in claim 16, including operations of:
comparing the time-varying signal, at a selected time, with the baseline value; and
determining a measure of actual force in response to the comparison.

18. The method as in claim 16, including operations of:
providing one or more first functions of the touch device in response to determining a touch is the first type of touch; and providing one or more second functions of the touch device in response to determining a touch is the second type of touch;
wherein the first functions are distinct from the second functions.

19. The method as in claim 16, wherein:
the baseline value at least partially corresponds to a selected fraction of the peak value of the derivative.

20. The method as in claim 16, wherein:
the baseline value is substantially constant for the particular user, despite a speed of the force of touch on the touch device.

21. The method as in claim 16, wherein:
the derivative is a first time derivative of the signal.

22. The method as in claim 16, wherein:
the force of touch sensors are capacitive sensors that provide data indicative of a measure of force of touch.

23. The method as in claim 16, wherein:
the force of touch sensors include at least one ultrasound device.

24. The method as in claim 23, wherein:
the force of touch sensors are ultrasound sensors configured to receive an internal reflection of an ultrasound signal.

25. A method, including operations of:
providing, by one or more force of touch sensors, a time-varying signal responsive to a force of touch;
by a processor coupled to a touch device, determining a baseline value in response to the signal and a derivative of the signal, wherein the baseline value is substantially stable for a particular user and is a value of the signal at a time after a peak value of the derivative of the signal;
by the touch device, outputting a response based on whether or not the force of touch exceeds the baseline value for the particular user and distinguishing between a first type of touch having less force of touch than the baseline value for the particular user, and a second type of touch having more force than the baseline value for the particular user.

26. The method as in claim 25, including operations of:
distinguishing a first particular user from a second particular user, based at least in part on the baseline value.

27. The method as in claim 25, wherein:
the derivative of the time-varying signal comprises a first time derivative of the signal.

28. The method as in claim 25, wherein:
the baseline value is substantially constant notwithstanding a speed of the force of touch on the touch device.

29. The method as in claim 25, wherein:
the signal corresponds to a time-varying force of touch, the time-varying force of touch responsive to a speed at which each particular user presses on the touch device.

* * * * *